United States Patent [19]
Ditzik

[11] Patent Number: 6,167,376
[45] Date of Patent: Dec. 26, 2000

[54] COMPUTER SYSTEM WITH INTEGRATED TELEPHONY, HANDWRITING AND SPEECH RECOGNITION FUNCTIONS

[76] Inventor: Richard Joseph Ditzik, 307 Surrey Dr., Bonita, Calif. 91902

[21] Appl. No.: 09/217,339

[22] Filed: Dec. 21, 1998

[51] Int. Cl.[7] ............................ G10L 21/06; G10L 15/24; G10L 15/26; G06F 3/16
[52] U.S. Cl. ........................... 704/235; 704/270; 704/231; 704/251; 704/275; D14/158; D14/154; D14/100; D14/341; D14/342
[58] Field of Search .............................. 704/9, 207, 278, 704/260, 235, 275

[56] References Cited

U.S. PATENT DOCUMENTS

| | | |
|---|---|---|
| 5,257,314 | 10/1993 | Kimura . |
| 5,287,415 | 2/1994 | Chefalas et al. . |
| 5,313,531 | 5/1994 | Jackson . |
| 5,361,310 | 11/1994 | Ishigaki . |
| 5,388,183 | 2/1995 | Lynch . |
| 5,434,777 | 7/1995 | Luciw ......................................... 704/9 |
| 5,454,046 | 9/1995 | Carman . |
| 5,459,798 | 10/1995 | Bailey et al. . |
| 5,477,511 | 12/1995 | Englehardt .............................. 704/235 |
| 5,500,920 | 3/1996 | Kupiec . |
| 5,502,774 | 3/1996 | Bellegarda ............................... 704/235 |
| 5,546,538 | 8/1996 | Cobbley et al. . |
| 5,546,565 | 8/1996 | Suzuki . |
| 5,602,963 | 2/1997 | Bissonnette et al. .................... 704/275 |
| 5,875,448 | 3/1999 | Boys et al. ............................... 704/278 |
| 5,884,249 | 3/1999 | Namba et al. ............................... 704/9 |

OTHER PUBLICATIONS

Atal, Bishnu S.: "Automatic Recognition of Speakers from their Voices", Proceedings of the IEEE, vol. 64, No. 4; Apr. 1976; pp. 460–475.

"Speech Understanding Systems" ; Semiannual Technical Summary Report to the Advance Research Project Agency; Massachusetts Institute of Technology; Lincoln Laboratory, Lexington MA; Jul. 23, 1974.

White, G.H.; and Neely, R.B.: "Speech Recognition Experiments with Linear Prediction, Bandpass Filtering, and Dynamic Programming"; IEEE Transactions Acoustic, Speech, Signals Proceedings; vol. ASSP–24 No. 2; Apr. 1979, p. 183–188.

Lee, R.; "Speech Recognition", *Information Display*; Society for Information Display; Apr. 1990; pp. 12–14.

Quinnell, R.A.; "Speech Recognition, No Longer a Dream but Still a Challenge"; *Electronic Design News (EDN)*; Jan. 19, 1995; pp. 41–46.

Comerford, R.; Makhoul, R. & Schwartz, R.: "The Voice of the Computer"; *IEEE Spectrum*; Dec. 1997; pp. 39–47.

Markowitz, J.; "Talking to Machines"; *Byte Magazine*; Dec. 1995; pp. 97–104.

*Primary Examiner*—Tālivaldis I. Šmits
*Assistant Examiner*—Daniel A Nolan

[57] ABSTRACT

A computer system with speech recognition systems and handwriting recognition systems are disclosed that work closely together to improve the total recognition accuracy of each system alone. Handwriting recognition system may include a pen/stylus input device and associated program functions. These systems or programs may be combined with computer and telephone functions to provide integrated applications having voice output programs, Internet access, e-mail/v-mail, and personal information manager functions. The computer system can recognize speaker-dependent and speaker-independent speech, converting this information to computer recognizable text, which may be displayed onto a display device in realtime or delayed. Speech recognition errors may be corrected via a pen input device, and the pen information may be recognized, converted to text and graphics. This data may then be displayed immediately or displayed later at a user specified time. Recognized handwritten pen information may be integrated into speech recognized text and stored in a data storage system.

13 Claims, 4 Drawing Sheets

FIG. 4

COMPUTER SYSTEM WITH INTEGRATED TELEPHONY, HANDWRITING AND SPEECH RECOGNITION FUNCTIONS

BACKGROUND OF INVENTION

1. Field of Invention

This invention relates to a computer system that integrates together, computer handwriting recognition and speech recognition systems, where key elements are under human control. The computer system further relates to means where individuals use the system to capture and record verbal information, which may be made up of consistent or inconsistent messages. The system may convert this information into text and/or graphic data formats. The resulting data may be useful in computer telephony applications or for further computer processing and/or data storage.

2. Description of the Prior Art

Prior art computer based handwriting recognition suffers from problems of imperfect recognition accuracy. Typically, user hand printing can be recognized with a 95–98% accuracy, if the user pre-trains the recognition software program with samples of his/her hand printed alphabet and numbers. Prior art products having handwriting input means such as the Apple Newton that has not obtained success in the market place. Human speech recognition programs must also be pre-trained with a limited number of speech samples, to obtain recognition accuracy of 95–98%. Continuous speech is more difficult to recognize than discrete speech, and, as such, suffers lower recognition accuracy. Speaker independent recognition is more difficult than speaker dependent pre-trained recognition programs. Speaker independent recognition software programs can be pre-trained for common speaker categories, such as English, male, female, southern accent, mid-western, New York, Jersey, Texan, or some combinations thereof. Recognition accuracy and performance of handwriting and speech input have many shortcomings and problems that have prevented them from being a successful computer application in the market place.

Prior art systems also include message recognition systems that use both speech recognition and handwriting recognition to transform a consistent message to a recognizable massage. However, in this prior art the original massage gathered by each of the recognition systems must be identical. This prior art system is restrictive, limiting it to transcribing functions only. The invention herein over comes that shortcoming by disclosing key elements and functions of a system having several recognition modes and several computing applications, wherein the source message need not be identical or consistent.

The inventions herein consist of combinations of key elements and modifications to existing elements to make new powerful communications systems, with unique computing applications. The invention herein uses the strengths of both the handwriting and speech recognition, along with telephony and other computing applications to make an improved recognition and computing environment. The invention may use the computing power of microprocessors, including multitasking or multiprocessing operating systems to control the operation of the system. The invention may also include digital signal processors (DSP) for fast calculations. The invention herein teaches a computing system running several programs or tasks, running at roughly simultaneous (e.g., realtime or near realtime). The user input modes of handwriting (via a pen/stylus input means) and speech recognition (via an audio capture means) work together for new improved computer input result. The two input modes complement each other well and can be combined with other computer means as disclosed below.

SUMMARY OF INVENTION

An important objective of this new invention is to provide a quick as easy system to capture, record and modify speech recognized text on the fly during (i.e., in near realtime). This objective may be accomplished by combination of computer telephony, pen input and speech input, each running roughly at the same time under control of computer system.

Another important objective is to provide an information system coupled closely with a computer telephony system, where speech information from one or more telephony systems (wire based or wireless) is recognized, annotated, and converted into text and graphics.

A still another objective is to improve computer based verbal information recognition by combining the individual strengths of handwriting recognition with those of speech recognition, resulting in an easy to use system with an overall increase recognition result.

Another objective is to provide a computer data conferencing system with information capture and transcription of conferencing data, converting it into text and/or graphics information, and possibly recording the data for future use.

Another objective is provide a computer desktop environment having a human in the loop. The system may be comprised of several near realtime processing steps, where the human may be in control of: 1) the system setup, 2) viewing the initial speech recognition results, 3) making decisions on correcting speech recognition errors, and 4) adding additional information not found in the initial speech message.

Still another objective is to provide a system where the user can make certain decisions on the best parameters in setting up the speech and handwriting recognition programs. Such human in the loop decisions may include selecting languages, dictionaries, grammar rules, phonological rules, dialect options, speech accent options, and special user data. These human in the loop selections will greatly improve the overall speech recognition accuracy and usability of the system.

Yet still another objective is provide a system where handwriting and sketched object recognition accuracy is greatly improved by user selection of certain handwriting recognition parameters—either before recognition processing or during the processing. Such selection or selections may include handwriting, stroke or pattern dictionaries (databases). Also, the system may include selection of a general or special linguistic rules databases.

BRIEF DESCRIPTION OF THE DRAWINGS

FIG. 4 is representation of a typical display screen for one or more system applications.

DETAILED DESCRIPTION

Figure 1:
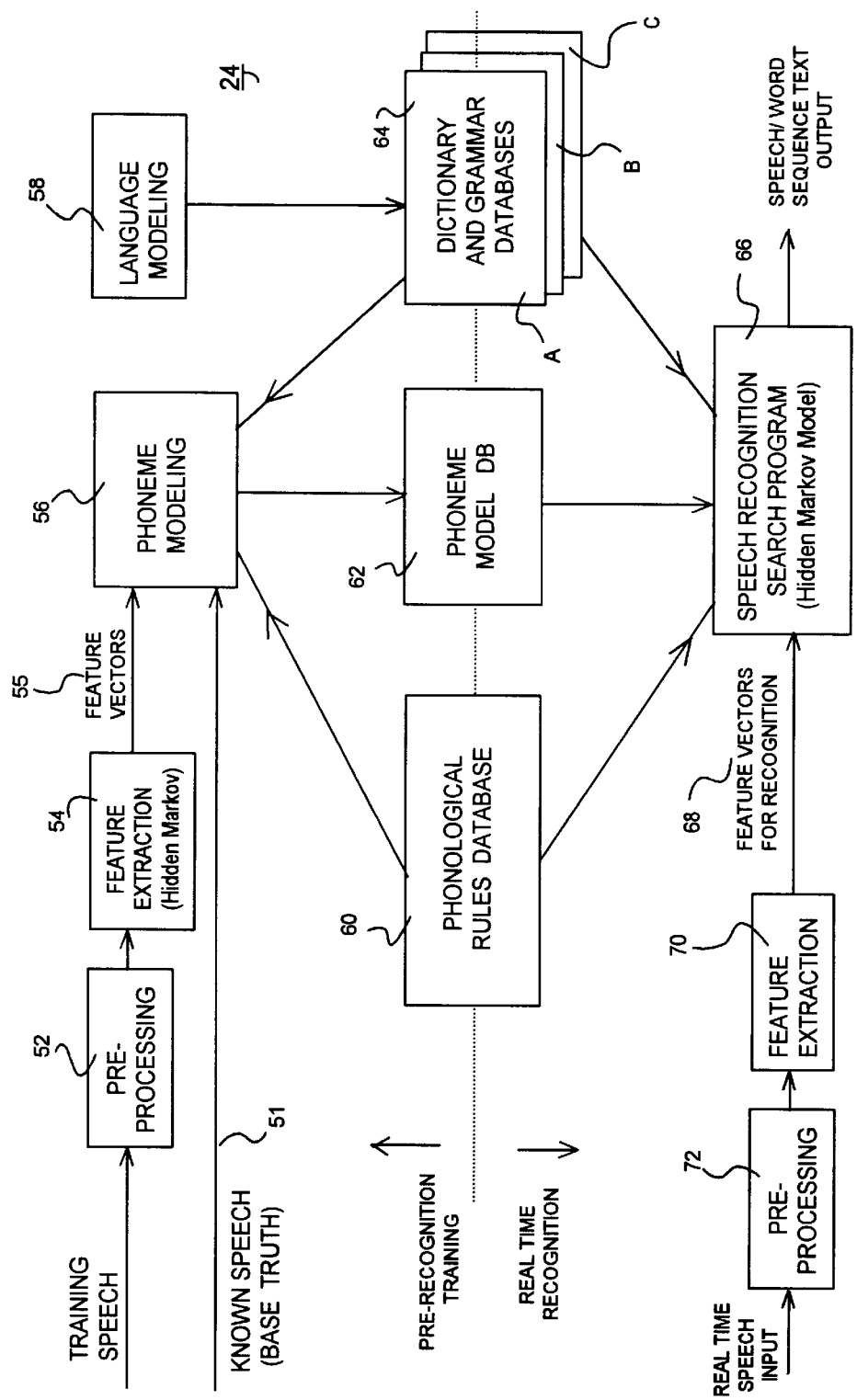
FIG. 1 is a block diagram a computer speech recognition system.

Several types of speech recognition means, known to those skilled in the art, may be embodied in the invention herein. Speech recognition programs and systems are available in the marketplace. For example, IBM® offers a product called Via Voice™; another product available is Naturally Speaking™, from Dragon Systems Inc. of Newton Mass. Both of these speech recognition systems are designed for IBM compatible PC running Windows 95™ or NT operating systems, typically running on Intel Corporation Pentium™ microprocessor computer systems. FIG. 1 shows a typical block diagram of a prior art speech recognition system 24. The system may be comprised of a training path and a near realtime speech recognition path. The computer system may be adapted to detect a person's spoken speech patterns (audio data) via a microphone (not shown in the figures) and other electronic components. Such a speech recognition system may be designed for speaker dependent or speaker independent operation. In the following, the training path of the system is described first, followed by the speech recognition path.

Speech recognition training may be performed to improve the recognition accuracy of the system. Speech patterns from one or more persons may be captured and sent to a pre-processing function 52, where the audio waveforms are sampled into a digital data stream at a sampling period of roughly 10–20 ms, for example. From element 52 the data is input to a feature extraction function 54, which may be based on the Hidden Markov Model (HMM), well known to those skilled in the art. The output of the feature extraction function 54 is a digital stream having a plurality of feature vectors 55, which may be input to a phoneme modeling function 56. The variability and uncertainty of speech processing is reduced by extracting from the speech waveforms one or more features, which are typically processed using phoneme modeling algorithms and hidden Markov model algorithms. Normal human speech has a large number of possible branches (directions) that can be chosen in a string of words. HMM may be used to statistically predict the best choice of words in the recognition process. Typically each phoneme is divided into three audible states: an introduction stage, middle stage and an exiting stage. Thus, a three-state HMM is usually included in a speech recognition system. Although absolute accuracy in not possible, the recognition program usually calculates the most likely sequence of states. For speaker independent systems, a base or ground truth of voice data consisting of known words or speech patterns may be input directly to the phonetic modeling function 56, perhaps during factory setup. As shown in FIG. 1, this input 51 is typically only necessary for speaker independent systems.

From the phoneme modeling function 56, data may be sent to a phoneme modeling database 62. This data is one of a plurality of databases that comprise the speech recognition database. Included in the database set may be a word dictionary and a grammar rules database 64. The grammar dictionary may contain the rules of allowable word sequences. The word dictionary may include several general or specialized vocabularies. Similarly, the grammar rules database may specialized for several identified speech recognition applications. This specialization is shown in FIG. 1 and represented by databases A, B, and C. A language modeling program 58 may input data to the word and grammar dictionary 64 that may in turn provide data to the phoneme modeling program 56. Another database consisting of a phonological rules database 60 may also provide data to the phoneme modeling program.

A person using the system typically will speak into a noise canceling type microphone that sends the resulting speech waveforms to pre-processing function 72 for digital sampling. Alternately the user may speak into a standard microphone such as a local or remote telephone. This data then is sent to a feature extraction function 70, which is similar to element 54. The resulting feature vectors for recognition 68 are sent to the speech recognition search program 66. Also, providing data to the search program may be the phonological rules database 60, the phoneme models database 62, and the word and grammar dictionary databases 64. The recognition search program 66 may be based on the Hidden Markov Model, which finds feature vectors representing a sequence of words from many possible combinations that are most likely. These calculations may be assisted by the application of vocabularies and rules data stored in the recognition databases. The output of the search program 66 maybe computer text of the speech input captured. In general, the speech recognition program predicts the most likely word sequence spoken.

One of the most difficult forms of speech to recognize is spontaneous telephone conversations, where error rates of up 50% are common with today's speech recognition systems. Increasing the size of the system's vocabulary (dictionary) does not always improve the recognition accuracy. This is due to the uncertainty of speech, i.e., the number of possible branches or directions that a person can speak when stringing a series of words together. The above is why a speech recognition alone, even with relatively high accuracy, has had difficulty in becoming a useful data input device for computers.

In general, computer handwriting recognition typically involve a pen or stylus input device, an electronic mean of digitizing the pen strokes, and a program to recognize the pen stroke data. Handwriting recognition system via a pen input means may transform hand written letters, numbers, punctuation, and symbols into recognizable computer generated text. This text or graphics may then be suitable for additional processing or data storage. Hand writing recognition may be comprised of either the discrete or cursive hand writing type program(s). Hand written information typically is comprised of stoke contours, intersections, and shape features, which may differentiate one handwritten word or mark from another. In this respect, handwriting recognition problem is similar to speech recognition, where in each case certain features of the raw data is exacted. This data is then compared to one of more databases, which may be comprised of language dictionaries (lexicons) and writing rules. Handwriting recognition may be accomplished in realtime or near realtime, and the data may be processed in chronological order as it was written.

Figure 2:
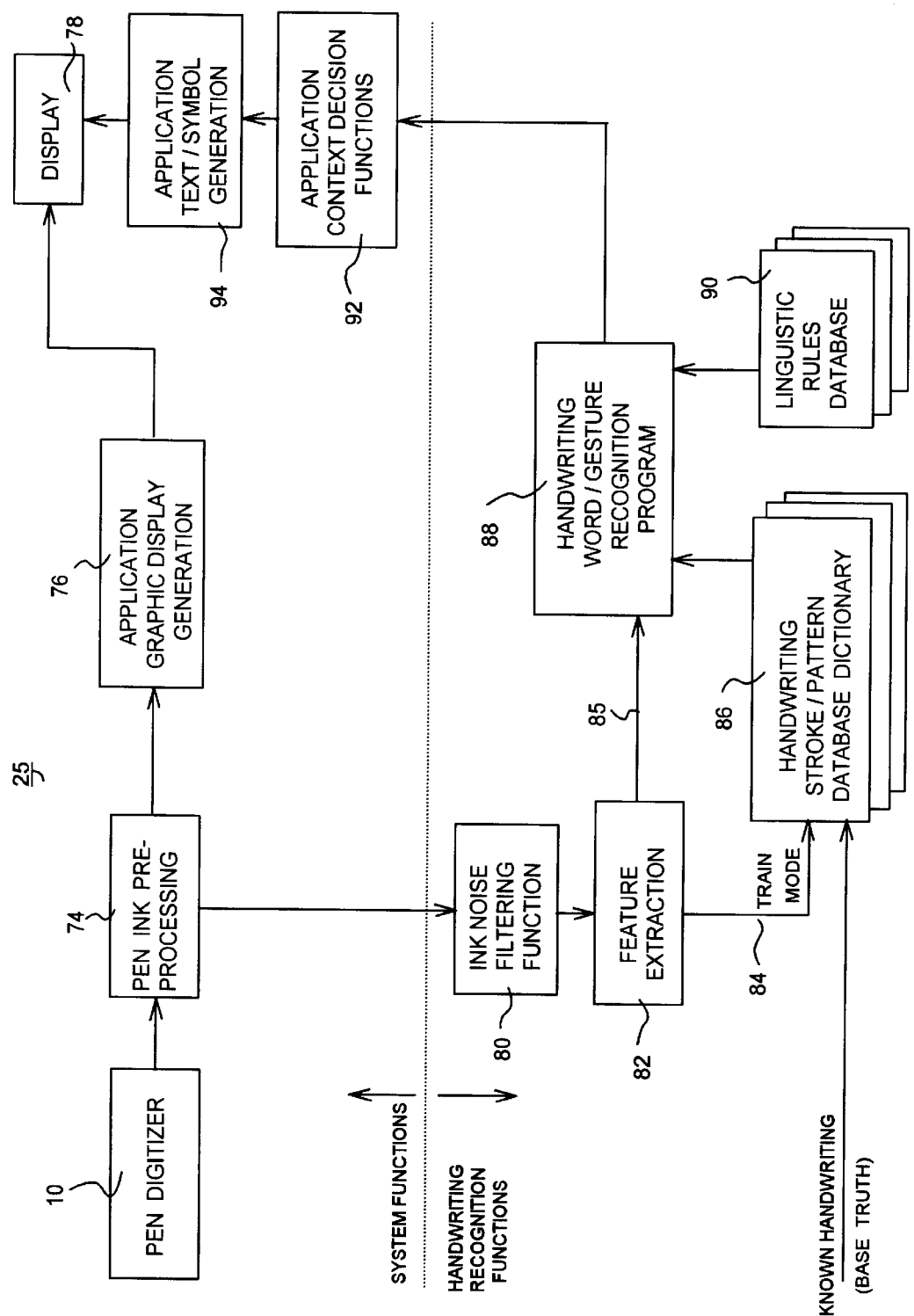
FIG. 2 is a block diagram a computer handwriting recognition system.

FIG. 2 shows a block diagram of a handwriting recognition system that may be known to those skilled in the art. Handwriting recognition includes computer recognition of handwritten cursive writing of handwriting, hand writing symbols/marks in any written language (formal or informal). As used herein, handwriting also includes recognition of hand written sketches and/or certain selected drawing shapes (circles, triangles, rectangles, etc.). A pen or stylus digitizer means 10 may repeatedly sample the user's pen strokes and digitize the x and y positions at rates roughly between 5–40 ms. The pen digitizer may be an opaque tablet separated from the display or a digitizing means place over the screen of the display device 78. The digital stream can be thought to represent "electronic pen ink" or "pen ink" for short. The digital stream from the digitizer may be sent to a pen ink pre-processing function 74, where the digital data may be filtered, smoothed, and/or scaled. Two outputs may be embodied in element 74 leading to rough two generalized processing paths. One output may lead to an application graphic display generation means 76. A second output may lead to an electron ink noise filtering function 80.

In the first path, the application graphic display generation means 76 accepts the digital stream representing electronic ink and generates codes necessary to graphically display an equivalent representation of the users hand written strokes. Codes may be sent to the display 78, which may be a display device, display monitor or display system. This processing may be accomplish in realtime; so the user can see the electronic ink paths of his/her writing and/or drawings on the display screen very quickly after each stroke. The application graphic display generation means 76 may be included in the operating system of the computer system and/or in the hardware of the computer system or display 76.

In the second path the pen electronic ink pre-processing function 74 sends data to an electronic ink noise filtering function 80, where further filtering of digitizer ink noise may be filtered out. One reason for this filtering function is that handwriting recognition accuracy is effected by digitizer noise to a greater degree than it effects recognition of handwriting by humans. Data from this filtering function may sent to a feature extraction function 82, where certain key features of the handwriting data is removed from the data, and may be placed in feature vectors. As in speech recognition, these feature vectors may optimized for HMM algorithms. Depending on the operating mode of the recognition system, the data from the feature extraction function 82 may be used either for user training 84 or for near realtime recognition 85. If the system is in the training mode, data 84 is input to a handwriting stroke and/or pattern database 86. This database may be comprised of one or more dictionaries with a plurality of hand writing/sketch patterns for one or more languages and/or special symbol applications. The database may also accept handwriting data from a known source with known writing samples, which represent a set of base truth data. As in speech recognition programs, base truth data is especially helpful for user independent recognition systems.

If the system is in the realtime recognition mode, data 85 may be sent directly to a handwriting word and/or pen gesture recognition program 88. This program also accepts data from the handwriting stroke and/or pattern database 86 and one or more linguistic rules database 90. The recognition program 86, which may be based on HMM techniques, which determines the best match or matches, by comparing the feature vectors to databases 86 and 90. This recognition program may be programmed to recognize handwritten pen gestures, which includes such marks as a coma, colon, semi-colon, arrow (right, left up, down), and other special symbols with predetermined meanings. Sample gesture patterns could be stored in the stroke/pattern database 86. The linguistic rules database may be comprised of multiple rules databases, for example different rules for different written languages and/or regional subsets. Data containing the best match or matches and other related data may be sent to an application context decision functions element 92. This element may contain information on the context of computer application running roughly simultaneously with the recognition programs. Context information can be a great help in narrowing the best matches of the recognition program, thus improving the overall recognition accuracy. Data from element 92 may then be sent to an application text and/or symbol generator function 94. This element may be embodied in the operation system and/or hardware of the computer system. Data from this generator function may be sent to the display device for display within the application running on the computer. Application context decision function(s) may be also included in the recognition system.

Figure 3:
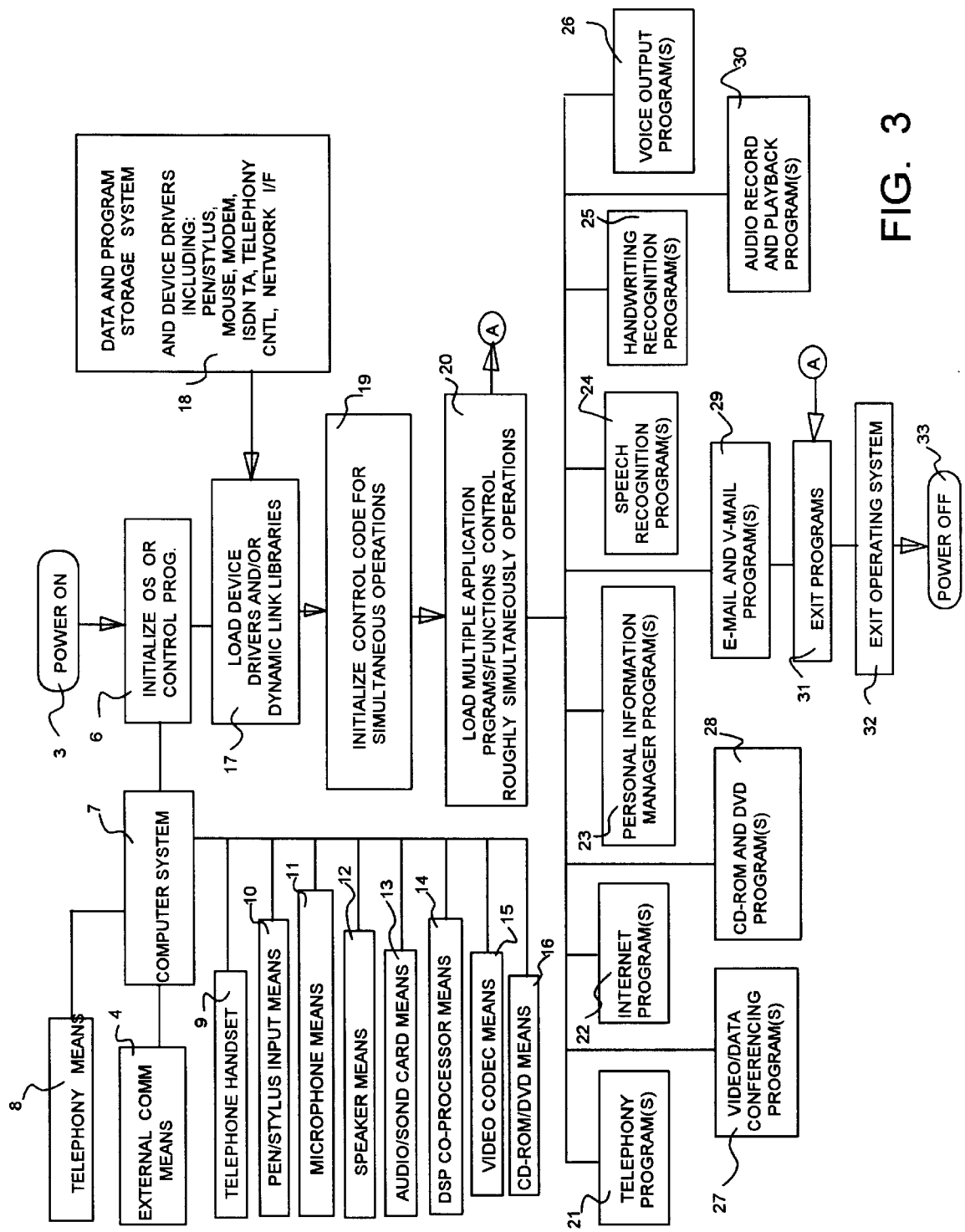
FIG. 3 is block diagram of system controls, application programs, and important system components.

FIG. 3 shows a block diagram of key computer system elements of the invention herein. The computer system and programs may be comprised of multi-media type elements, which may be adapted for computer telephony, data/video conferencing as well as general purpose computing and remote communication functions. The computer system 7 may consist of typical personal computer (PC) components, including microprocessor, interface chip sets, main memory, mass disk memory, I/O bus, display monitor, keyboard and mouse devices. At power on 3 an operating system is typically loaded, which may be a windows based graphic user interface type operating system, such as Microsoft Windows® 95/NT/CE operating systems. Interfaced to the computer system may be several devices and/or software programs, including telephony means 8, external communication means 4 for remote data transmit and receive functions to other systems, for two-way data interchange, such as connection to the Internet. Telephony means may include one or more hardware components and software, providing for telephone and fax functions.

The system may include a pen/stylus input means 10, which captures a handwriting or graphic symbols from a person. Element 10 may be comprised on an opaque graphic tablet or transparent device, placed over a display screen. In addition to the above, the system may be comprised of a telephone handset device 9, microphone means 11, audio speaker(s) 12, audio /sound card means 13, DSP co-processor and electronic card means 14, video codex means 15, and CD-ROM/DVD playback/record means 16. These elements may be embodied separately or in combination as required for the specific configurations desired.

The operating system 6 may load all the necessary device drivers and/or dynamic link libraries (DLL) 17, automatically or via a command. Some of the device drivers may include pen/stylus, mouse, analog modem, ISDN terminal adapter, telephony controller and network interface card drivers. The system may initialize, load and control a plurality of roughly simultaneous programs, tasks, threads and/or operations, including additional control code or OS extensions 19, and application programs 20. Program code may be loaded to control tasks that are designed to run roughly simultaneously or at different times. Some of the software programs that may be loaded for computing or communications are telephony 21, Internet browser/applets 22, personal information manager (PIM) 23, speech input 24, pen/stylus applications 25, and voice output programs 26. Voice output programs may consist of text to speech programs or digital speech playback of recorded speech (compressed or uncompressed). Other programs may include video and data conferencing programs 27 (via telephone or Internet), CD-ROM and/or DVD control programs 28, E-mail/V-mail and fax programs 29 and/or audio record and playback programs 30. The user can choose programs to load and execute, depending on the user's desires. When the user is finished with his/her computing or recognition tasks, the user may issue an exit command 31. The user can then exit the operating system 32 and turn off the power 33 to the computer system.

The speech input recognition program/functions 24 and associated hardware may include several functions including speech capture (via microphone or telephone line), digitize data, process data, store raw speech data, and storage of recognized text. The pen/stylus input handwriting recognition program/functions 25 and associated hardware may include the following functions: handwriting capture, drawing capture, inking (displaying pen tracks). The system may store pen data, process data, perform pen gesture recognition and/or compression of the pen data. The Telephony program/task 21 and associated hardware may perform the following typical application functions: call answering, outgoing message play, call forwarding, incoming message recording, screen pop ups, manual dial out, auto dial out, and/or Voice mail control (record, route, store), among others. The PIM program/tasks 23 may include the following typical functions: calendar, address book, things to do, date-time stamp, and data base store/control functions. Voice output program/task functions may include audio speaker control (free standing and handset), voice data playback, text to speech control, playback speed/pitch control. In addition typical CD-ROM multimedia and new DVD record and playback control and processing may be included in the system. The computer system CPU may be powerful enough for multiple programs, tasks and/or threads to run at near realtime, such that the user may think that programs are running simultaneously.

Figure 4:
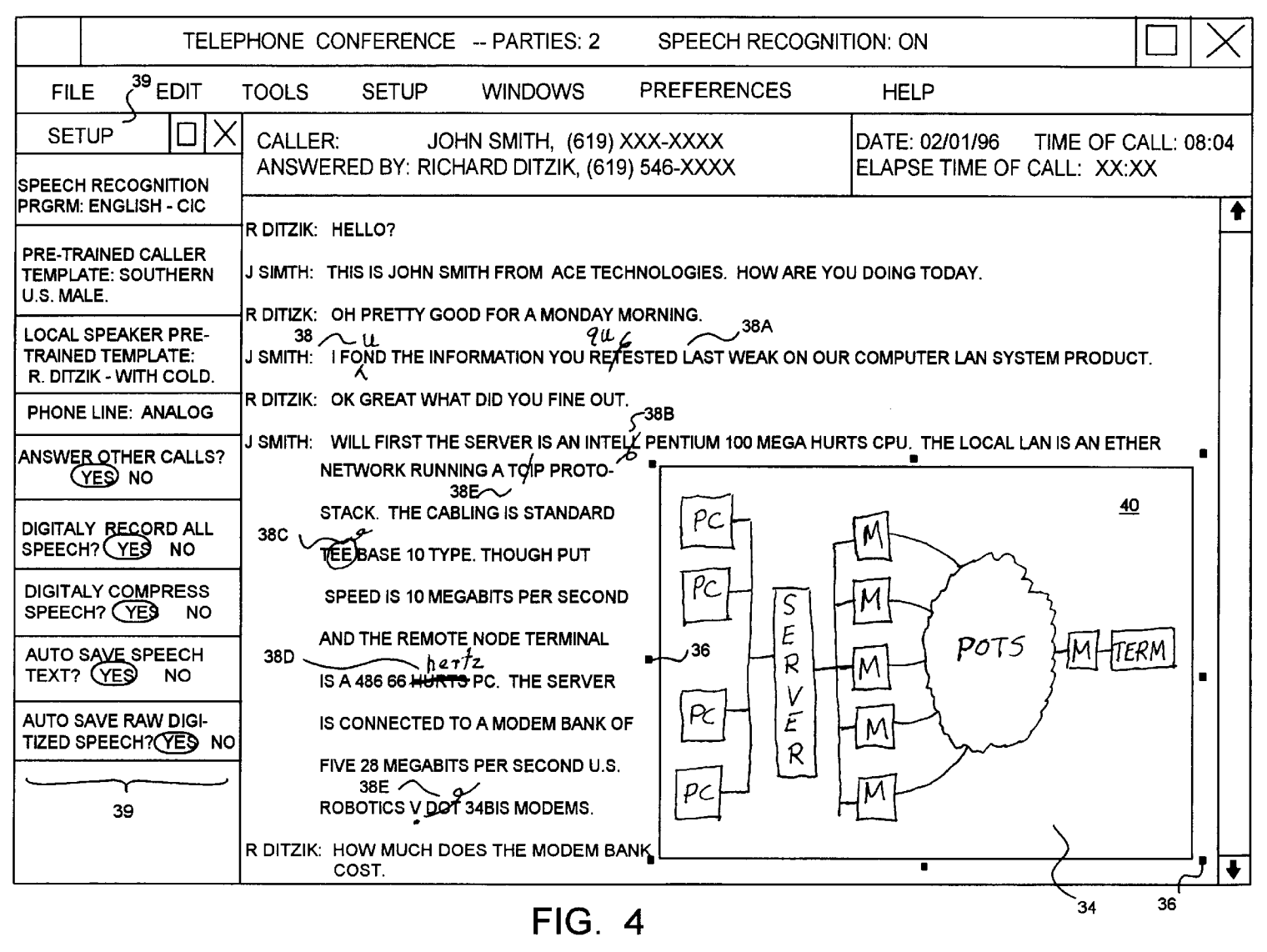

FIG. 4 shows a representation of the computer system's display screen, with a new unique computer telephony application program. In this disclosure, telephony includes telephone-like connections to communication networks such as telephone, Internet, and cable networks. This system makes use of pen/stylus input means and speech input means, with both handwriting and speech recognition functions enabled (turned on) at the same time. The screen shows the name of the caller (via a caller ID function), the name of the answering party, date and time. The audio signal for the speech may sent to a speaker so that the user ca listen the speech information; the user may then make one or more decisions on the system setup options desire, as shown in menus 39. Speech data from both the caller and local user may captured, digitized, processed, recognized and displayed on the screen at near realtime. Since speech recognition is not perfect, recognition errors and omissions may be displayed along with the correctly recognized text. Recognition of the caller speech over the phone lines may be slightly worse than the local user's speech. As these recognition errors are observed by the viewer, he/she may use the pen or stylus to correct these speech recognition errors or omissions by direct hand writing on a writing pad or on the screen. The speech recognition errors on the screen are represented in the figure by corrections 38, 38A, 38B, 38C, 38D, and 38E. The user may quickly and efficiently make editing marks (inking) with the pen, as shown. The pen marks and handwriting may be recognized immediately, but could be displayed after a delay interval selected by the user. The user, viewing the text of the two-way conversations, can make editing marks without losing concentration on what is being said during the telephone call or audio input. In an alternative embodiment, the user may have the option to delay the display of recognized handwriting data until the user provides a command action, perhaps by click an icon or menu item. The software application may also include code to provide means to quickly add one or more graphic frames 34. The user can draw and write in the frame, to record graphical representations 40 of what is being said by either party. Graphic frames can be scaled and sized via the graphic handles 36. Long conversations yielding much text can be accommodated by automatically scrolling off text from the screen. However, such data may remain stored in memory such in a data storage system 18. Manual scroll bars may be provided. Text can be made to wrap around the graphics frame 34 as in typical word processor or draw programs.

The operating system may support multiple independently controlled cursors to make the graphical user interface easier and faster to use. The setup of the program may have several options, as shown on the left side of FIG. 4. Many other typical computer application features may be included, as are well known to those skilled in the art. Although many tasks can be processed with little observable delay, other calculations and tasks may be compute intensive. There may be some delay in the display of speech and handwriting recognition text results, even with the help of DSP co-processors. However, the delays in the 500 ms range—may be small enough not to cause a human factors problem with respect to the user. Other delays may exist in pen inking, shape recognition or gesture recognition. When two or more of these systems are connected via an external communication system, there may be inherent communication delays. However, depending on the type and speed of the external communication means, response times should be made small as not be objectionable. The system may feature a delay option for the handwriting recognition, so that the user can view his or her pen input electronic ink for the screen or multiple screens, before the recognition data is displayed. A portion of the screen or screens may be displayed instead of the entire recognized data. The system may have telephone connection (POTS, ISDN, ASDL, HSDL, ATM, etc.), cable TV interface, Internet connection, and/or wireless communication. Interlaces to the network may be analog or digital or a combination. The inventions herein are compatible with video and data conferencing means. Many clever and useful combinations of PC and telephony applications can be embodied to provide new collaboration, groupware conferencing and remote communication uses.

One purpose of this new invention is to provide a user friendly means to capture, recognize and record speech from one or more individuals. Also, the system provides functions to convert recognized speech data to computer text at near realtime or delayed. One such application could be during telephone conferencing use where written text of the call is to be obtained. This may be accomplished by this unique combination of pen input and speech input running on a microprocessor computer system. The user may not choose to recognize and manipulate all telephone conversations. When an important or critical call is answered and/or complex information is being verbally communicated to the user, this invention will enable one to activate the system to capture and record 100% of the information communicated. The system may then record it in a computer readable text and/or graphics format. The embodiments presented herein are but a few possible embodiments of the invention herein, other embodiments, extensions and improvements are obvious to those with an ordinary skill in the art.

I claim:

1. A method of performing handwriting and speech recognition functions, the method implemented in a programmed computer comprising a processor, a data storage system, at least one user input device, and at least one display device, the method comprising the steps of:
   a. providing at least one control program to control the said computer;
   b. receiving speech input spoken by a user, converting the said input into computer recognizable data under control of the said computer's control program;
   c. recognizing the said speech data by identifying the best match to known words or phases of a spoken language;
   d. receiving handwriting data from a user via a pen or stylus input device under control of the said computer control program;
   e. recognizing the said handwriting data from said user pen input and converting it into text, graphics or both;

f. displaying said recognized speech text with any recognition errors, and displaying said converted recognized handwriting data, at roughly the same time as said speech text; and g. altering by adding, changing or deleting said displayed text via said pen or stylus input device.

2. A method as recited in claim 1, in which the handwriting data from the said pen input device is not recognized and is displayed as electronic ink on said display, tracking the pen tip's path.

3. A method as recited in claim 1, in which the user has the option to display said recognized handwriting data within a time delay interval, wherein the maximum delay range interval is measured beginning immediately after recognition process is completed to the time of a command given by the user.

4. A method as recited in claim 1, further comprising steps to provide computer telephony functions, wherein voice and data information is communicated to and from telephone like communication networks, and wherein incoming speech information from a remote telephone is accepted, recognized and displayed in similar manner as the local speech input.

5. A method as recited in claim 4, in which the displaying speech text and handwriting data step presents at least one screen showing speech recognition setup menus, handwriting recognition setup menus, and telephony program setup menus.

6. A computer program, residing on a computer-readable medium, comprising instructions for causing a computer system to:

a. provide for bi-direction information flow to and from an operating system running on the said computer system;

b. receive speech input spoken by a user converting said input into computer recognizable data under control of the said operating system;

c. recognize the said speech data by identifying the best match to known words or phases of a spoken language;

d. receive handwriting data from a user via a pen or stylus device under control of the said operating system;

e. recognize the said handwriting data from the, said user pen input and convert it into text, graphics or both;

f. display the said recognized speech text with any recognition errors, and displaying the said converted recognized handwriting data, at roughly the same time as the said speech text; and g. alter by adding, changing or deleting said displayed text via said pen or stylus input device.

7. A computer program as recited in claim 6, in which the handwriting data from said pen input device is displayed as electronic ink on said display, wherein the displayed electronic ink roughly tracks the pen tip's path during handwriting, and wherein the delay is measured almost immediately after the recognition process is completed and ending at the time of a command.

8. A computer program as recited in claim 6, in which the user has the option to display said recognized handwriting data at a setable a time delay, wherein the delay interval is measured beginning almost immediately after recognition process and is completed after a set delay time.

9. A computer program as recited in claim 6, in which the user has the option to display said recognized handwriting data at a time delay, wherein the delay is measured beginning almost immediately after recognition process is completed and extending to the time at which a command given by the user.

10. A computer program as recited in claim 6, further comprising instructions for causing a computer system to provide computer telephony functions, wherein voice and data information is communicated to and from telephone like communication networks, and wherein incoming speech information from a remote telephone is received, recognized and displayed in similar manner as the local speech input.

11. A computer program as recited in claim 10, in which the telephone like communication networks include the Internet network or similar wide area computer networks.

12. A computer program as recited in claim 6, further comprising instructions for causing a computer system to display at least one screen showing setup menus with speech recognition, handwriting recognition, and optionally telephony program information.

13. A computer program as recited in claim 6, further comprising instructions for causing a computer system to have at least one integrated voice output program for audio output of recorded or realtime speech information.

* * * * *